F. C. OVERBURY.
SHINGLE STRIP MACHINE.
APPLICATION FILED SEPT. 7, 1915.

1,301,964.

Patented Apr. 29, 1919.
2 SHEETS—SHEET 1.

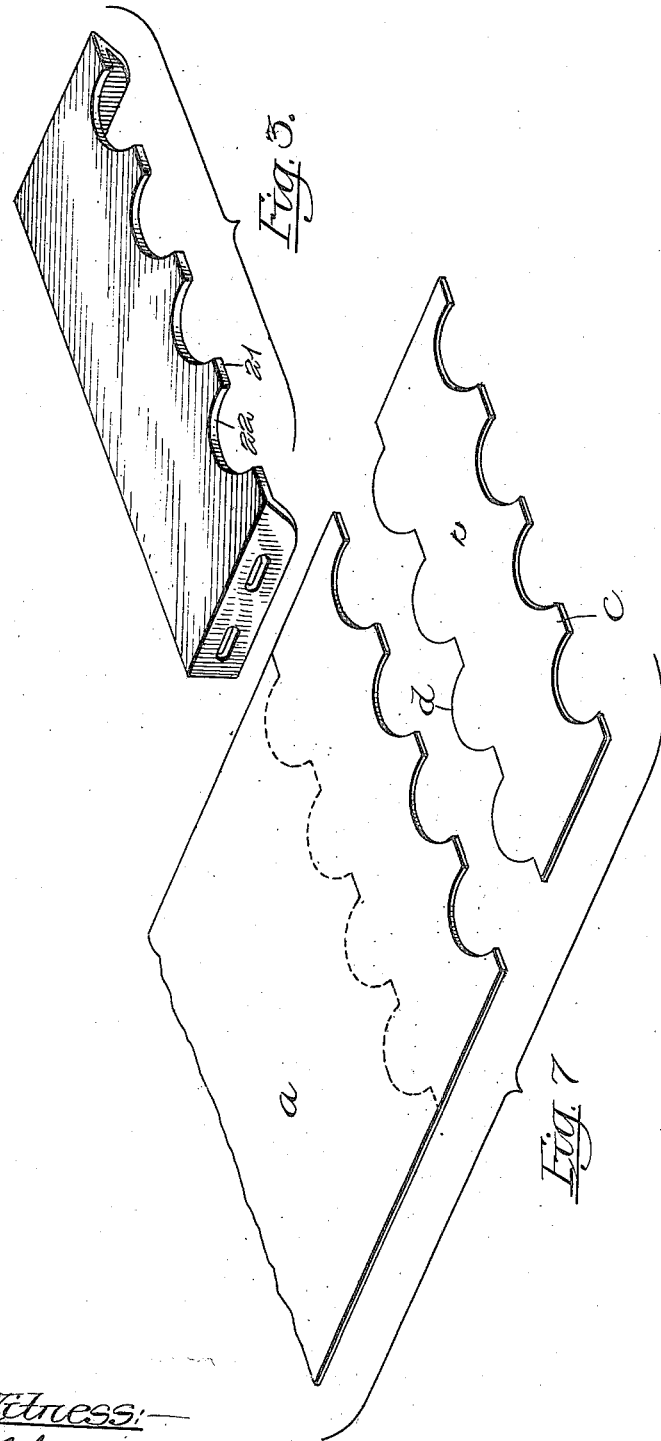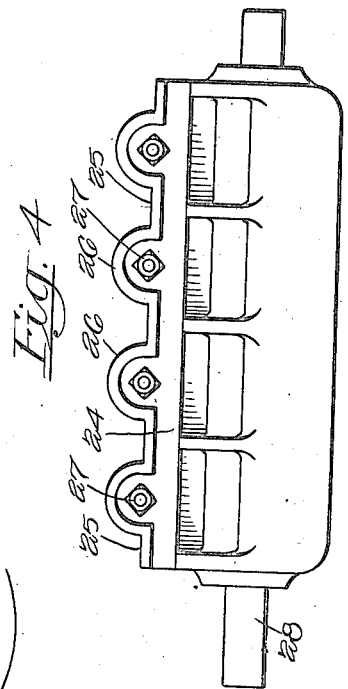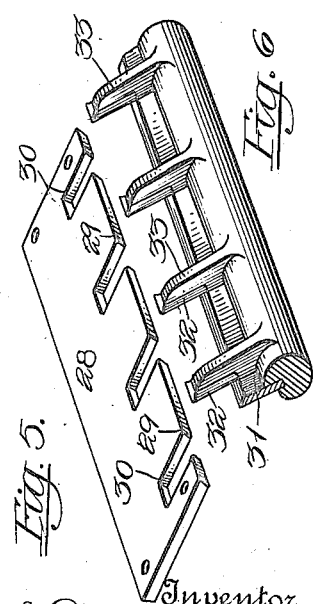

UNITED STATES PATENT OFFICE.

FREDERICK C. OVERBURY, OF HILLSDALE, NEW JERSEY, ASSIGNOR, BY MESNE ASSIGNMENTS, TO THE FLINTKOTE COMPANY, OF BOSTON, MASSACHUSETTS, A CORPORATION OF MASSACHUSETTS.

SHINGLE-STRIP MACHINE.

1,301,964.   Specification of Letters Patent.   Patented Apr. 29, 1919.

Application filed September 7, 1915. Serial No. 49,248.

*To all whom it may concern:*

Be it known that I, FREDERICK C. OVERBURY, a citizen of the United States, and a resident of Hillsdale, in the county of Bergen and State of New Jersey, have invented certain new and useful Improvements in Shingle-Strip Machines, of which the following is a specification.

This invention relates to machines for making shingle strips, such as shown for example in Letters Patent No. 1,150,298, granted to me on August 17, 1915.

On the accompanying drawings,—

Fig. 3 represents the stationary shear blade.

Fig. 4 illustrates the movable cutter for coöperating with the stationary blade.

Figs. 5 and 6 represent a blade and cutter for forming rectangular tabs on the shingle strips.

Fig. 7 illustrates a sheet of roofing material and a severed shingle strip.

Figures 1, 2:
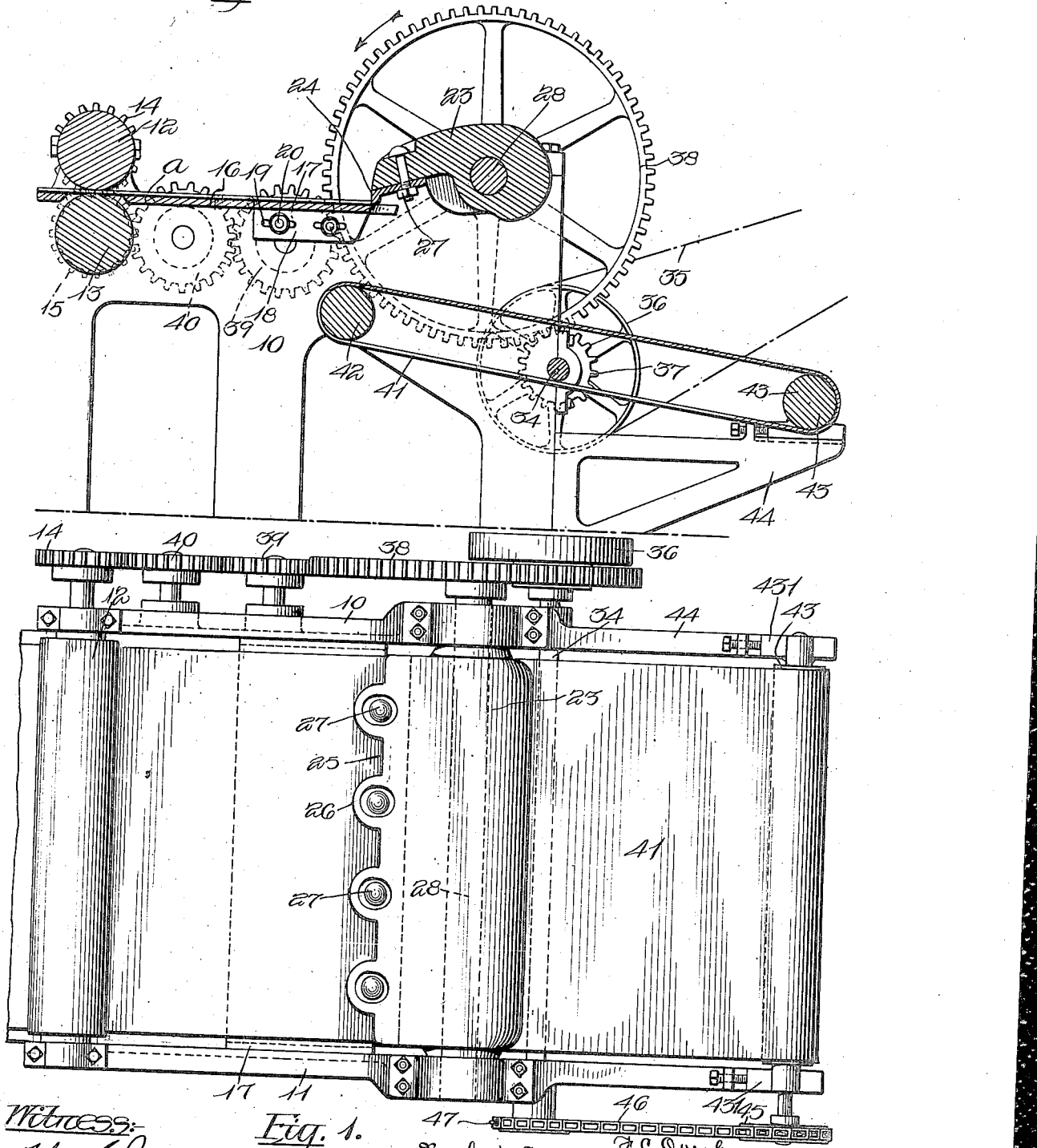
Figure 1 represents a plan view of a machine embodying my invention.
Fig. 2 represents a longitudinal section through the same.

The material, upon which the machine is intended to operate, consists of an elongated sheet of roofing felt, *i. e.* felt or other equivalent fibrous material saturated or impregnated with asphalt or other waterproofing compound, and coated on one or both faces with hard pitch or asphalt, such as will withstand the action of the weather and will not be deleteriously affected by solar heat. Pigment may be incorporated in the coating to impart the desired color thereto, or crushed slate or other mineral may be embedded in the coating, if desired, so as to provide a mineral facing. Such sheets are furnished in various widths, and, by means of the machine to be described, they are severed transversely into shingle strips having spaced tabs or projections of predetermined shape or configuration. When said strips are laid in horizontal overlapping rows, the exposed tabs or projections simulate or present the appearance of shingles or tiles. Hence I term them "shingle strips."

Referring now to the drawings, the machine there shown is provided with a framework of any suitable character; for instance, it may have the side frames 10, 11. Journaled in proper bearings in said frame are the coöperating feed rolls 12, 13, which are geared together by the gears 14, 15, to one of which power is applied as will be subsequently explained. Beyond the feed rolls, with their surfaces tangential to the periphery of the roll 13, are a plate 16, and a shear block 17, the ends of which are secured to the side frames. As shown in Fig. 2, at the ends of the block 17 are downwardly projecting flanges 18 with elongated slots 19 through which bolts 20 or other fastenings are passed into the side frame, whereby the block may be adjusted for a purpose to be described.

The shear block has a cutting edge transverse with relation to the sheet $a$, said edge being made up of the straight portions 21 and the indented or concavely curved portions 22. For coöperation with said stationary blade, there is a rotary cutter or chopper 23 having a blade 24 whose edge is complemental thereto. As shown in Fig. 4, said blade 24 has an edge comprising the straight portions 25 and the convexly curved portions 26. Said blade is secured upon the rotary chopper or cutter by bolts 27. The cutter is formed on or secured to a shaft 28 whose axis is located above the plane of the table 16 and the shear block, so that, when it is rotated, the sheet is cut transversely into strips whose length is equal to the width of the sheet. The formation of the coöperating cutting members is such that the strips $b$ are provided on both edges with tabs or projections $c$ and $d$ which are complements of each other.

It is quite evident that tabs or projections of different configurations may be produced by varying the edges of the coöperating blades. For example, in Figs. 5 and 6, the stationary shear blade 28 has the straight edges 29 and the rectangular indented edges 30. The cutter, on the other hand, has a straight edge blade 31 which is continuous from end to end, and supplemental rectangular cutters 32 secured upon the arms 33. In this case, the straight blade partially severs and partially tears the fabric transversely on a straight line, before the supplemental cutters cut the fabric, as a result of which each severed shingle strip has one straight edge, and has on the other edge rectangular tabs or projections. The indented edges 30 are usually narrow, so that there is no difficulty in forming a straight cut across the fabric, to form a straight upper edge on the shingle strip.

Any suitable power-transmitting mechanism may be utilized for imparting movement to the herein described instrumentalities. For example, I may employ a power shaft 34 driven by a belt 3 and pulley 36; and having a pinion 37 intermeshing with and driving a large gear 38 on the cutter shaft 28. From said gear 38 power is transmitted to the feed rolls by intermeshing idler gears 39 and 40.

I have found it convenient to employ an endless conveyer belt 41 arranged to receive the several strips, as shown, in which case it is supported by the rolls 42, 43. The trunnions of the latter are journaled in adjustable bearings 431, on brackets 44 projecting from the side frames, one of said trunnions having a sprocket 45 driven by a chain 46 from a sprocket on the shaft 34.

Having thus explained the nature of my said invention and described a way of making and using the same, although without attempting to set forth all of the forms in which it may be made or all of the modes of its use, what I claim is:

1. In a machine for cutting non-metallic flexible sheet roofing into shingle strips, the combination with a frame and feeding rolls for the sheet, of a stationary shear block arranged transversely of the direction of feed of the sheet, and having a cutting edge comprising a plurality of alternating straight portions and recessed portions, and a rotary cutter having a continuous straight cutting blade to coöperate with the straight edge portions of the shear block to sever a strip transversely from the sheet, and having a plurality of spaced supplemental blades complemental to the recessed edge portions of the shear block, to cut recesses in the end of the sheet.

2. A machine for cutting non-metallic flexible sheet roofing into shingle strips, comprising rolls for feeding the sheet, and cutting devices consisting of a stationary block and a co-acting rotary cutter arranged transversely to the path of the sheet for forming from said sheet a series of shingle strips, said cutting devices having supplemental recesses and projections, said rotary cutter also having a blade for severing the waste pieces.

3. A machine for cutting non-metallic flexible sheet roofing into shingle strips, comprising rolls for feeding the sheet, and cutting devices for the sheet consisting of a stationary cutter block and a co-acting rotary cutter having supplemental projections and recesses for forming a series of shingle strips transversely of the sheet, the rotary cutter having also a continuous blade for co-acting with the stationary block to sever the waste pieces.

4. A machine for cutting shingle strips transversely from a sheet of roofing material, comprising feed rolls for the sheet, a support for the traveling sheet, and cutting means arranged transversely to the path of the sheet for severing the same, said cutting means comprising a stationary cutter and a rotary cutter, said stationary cutter having a series of equally spaced recesses, and said rotary cutter having a series of projections to coöperate with said recesses, and also having a straight edge blade for severing the waste pieces at one end.

5. In a machine of the class described, a rotary cutter having a straight edge cutting blade and spaced blades each provided with side and end cutting edges.

In testimony whereof I have affixed my signature.

FREDERICK C. OVERBURY.